A. R. BULLOCK.
CURRENT CONVERTING MACHINE.
APPLICATION FILED JUNE 19, 1913.

1,267,969.

Patented May 28, 1918.
3 SHEETS—SHEET 1.

Inventor
Arthur R. Bullock
by Thurston & Kwis
atty

Witnesses.
E. B. Gilchrist
A. J. Hudson

A. R. BULLOCK.
CURRENT CONVERTING MACHINE.
APPLICATION FILED JUNE 19, 1913.

1,267,969.

Patented May 28, 1918.
3 SHEETS—SHEET 3.

Witnesses
E. B. Gilchrist
A. J. Hudson

Inventor
Arthur R. Bullock
by Thurston & Kwis
attys

UNITED STATES PATENT OFFICE.

ARTHUR R. BULLOCK, OF CLEVELAND, OHIO.

CURRENT-CONVERTING MACHINE.

1,267,969.  Specification of Letters Patent.  Patented May 28, 1918.

Application filed June 19, 1913. Serial No. 774,520.

*To all whom it may concern:*

Be it known that I, ARTHUR R. BULLOCK, a citizen of the United States, residing at Cleveland, in the county of Cuyahoga and State of Ohio, have invented a certain new and useful Improvement in Current-Converting Machines, of which the following is a full, clear, and exact description.

This invention relates to a device for the conversion of electrical currents from one form to another,—that is to say, the conversion of alternating to direct current, or vice versa.

The object of the invention is to provide a device of the character mentioned in which the current converted is commutated from current passing through an autotransformer or a transformer in such a manner as to obviate any sparking when the machine is run under proper conditions.

Figure 10:
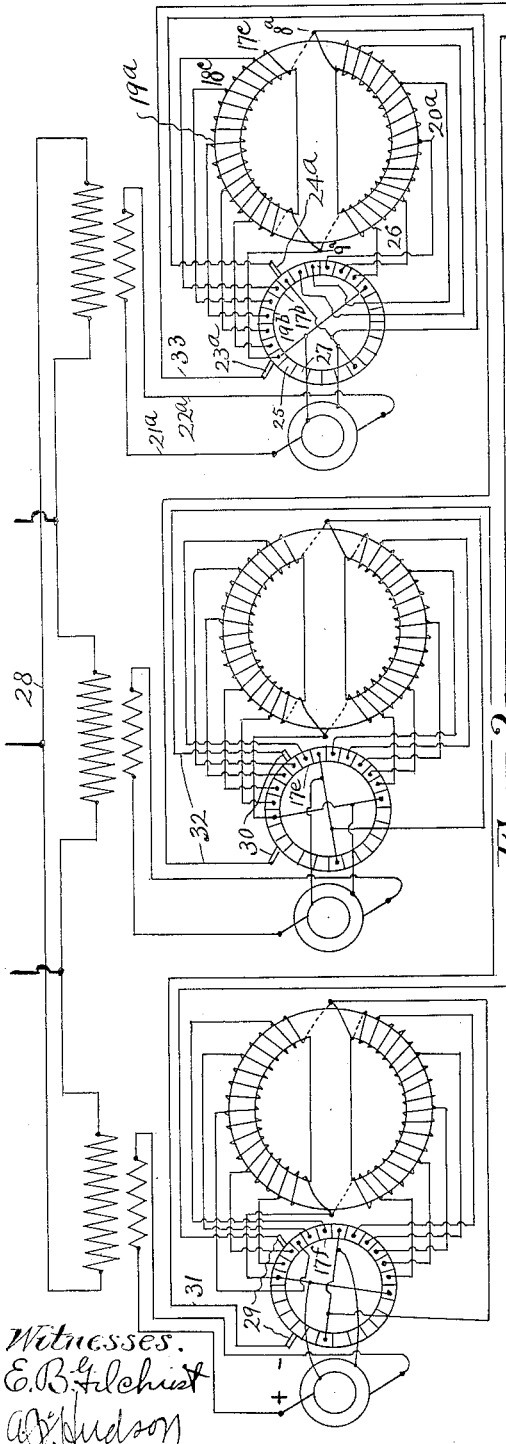
Figure 11:
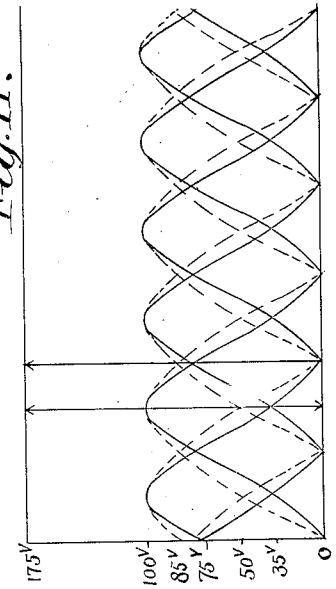
Figure 3:
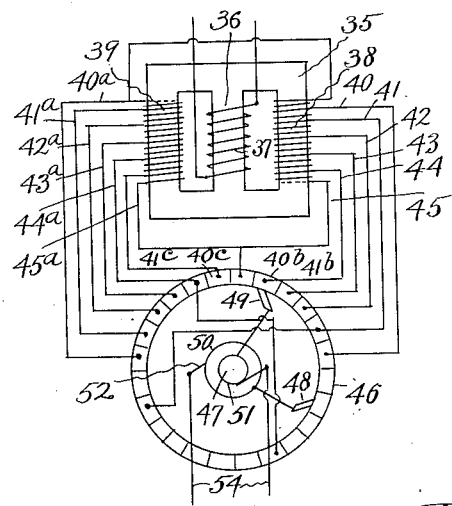
Figure 5:
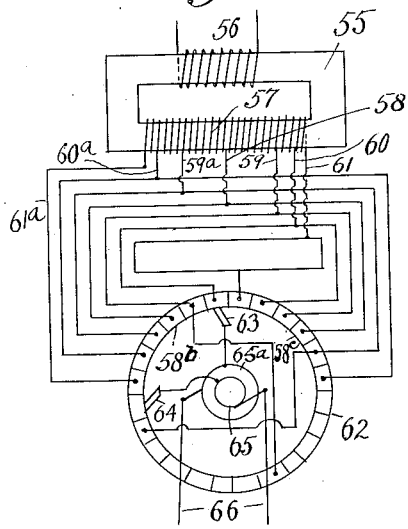
Figure 4:
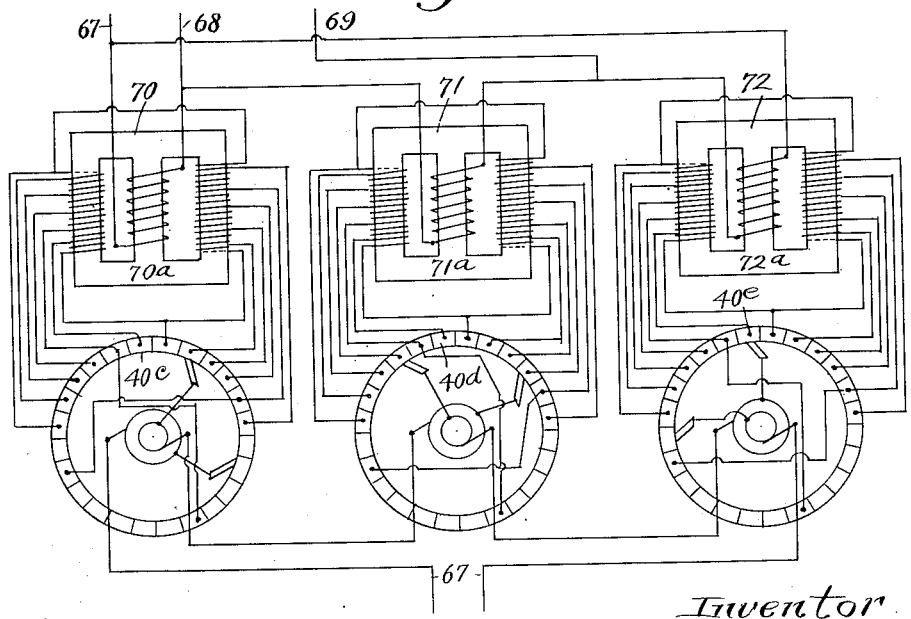
Figure 6:
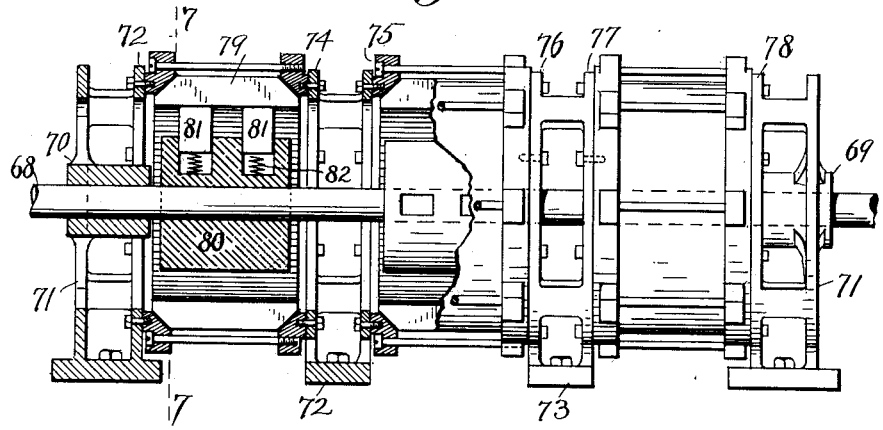
Figure 7:
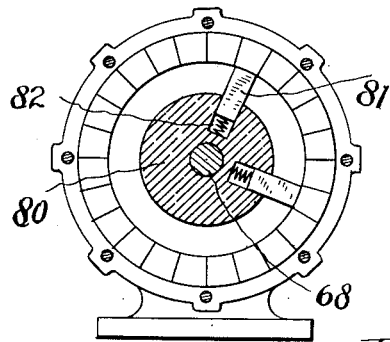
Figure 8:
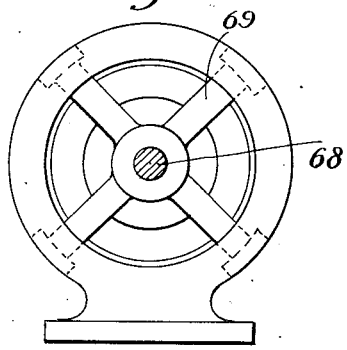
Figure 9:
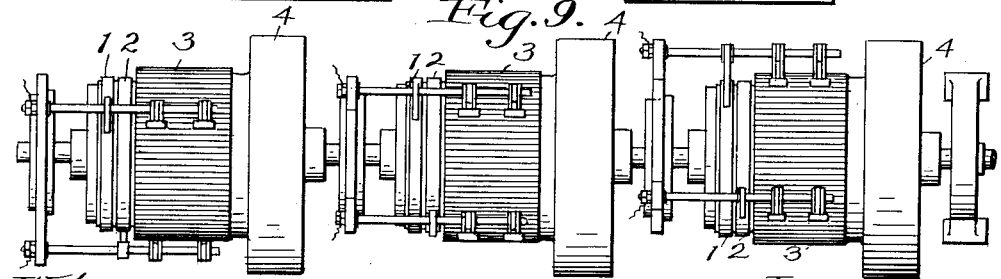

Generally speaking, the invention comprises the elements and combinations thereof set forth in the accompanying claims. Reference should be had to the accompanying drawings forming a part of this specification, in which—Figure 1 is a diagrammatic view illustrating the electrical connections for the purpose of changing a single phase alternating current to direct current. Fig. 2 is a diagrammatic representation of a plurality of devices such as shown in Fig. 1 arranged to rectify a three-phase current. Fig. 3 is a diagrammatic illustration of a machine working on the same principles as that shown in Fig. 1, but of modified form. Fig. 4 diagrammatically represents a machine, such as shown in Fig. 3, amplified to rectify a three-phase current. Fig. 5 is a diagrammatic illustration of a modified form of machine shown in Fig. 3. Fig. 6 is an elevation with certain portions in section illustrating the commutator arrangement used with the machines shown in Figs. 3 to 5 inclusive. Fig. 7 is a section along the line 7—7 of Fig. 6; and Fig. 8 is an end elevation of a construction shown in Fig. 6. Fig. 9 is a top plan view of a device such as diagrammatically shown in Figs. 1 and 2. Fig. 10 is a diagram of the voltage curve of usual rectified three phase current. Fig. 11 is a diagram of the voltage curve of three-phase current and of the rectified direct current.

As is well known, the problem of converting alternating current to direct current for power purposes has been a problem which has received considerable attention and effort in the endeavor to produce a converting device of the commutator type because of its simplicity and high efficiency. Rotary transformers and the motor generator sets are at the present time the usual commercial devices used for this purpose, which machines are of considerable size in large power installations and of only fair efficiency.

From the construction of the machine herein disclosed it will be apparent that its construction is such that in comparatively small machines heavy currents may be readily converted, for the principle of transformer construction, which is very well understood, is the one which is largely made use of in this apparatus.

In general my invention comprises a coil or coils of conducting wire wound upon a core of magnetically permeable material (preferably laminated),—the coil being provided with taps from end to end,—pairs of taps which represent equal voltage difference or change from the ends of the coil being successively connected in proper order, and the current flowing between such taps being passed through distinct circuits.

As before stated, the magnetically permeable core and its winding may be an autotransformer, or form part of a usual transformer. In the first instance I will explain a form of my invention which utilizes an autotransformer.

In the particular form of machine which is diagrammatically illustrated in Figs. 1 and 2 and further shown in Fig. 9, there is mounted upon a common shaft a pair of rings 1 and 2, a commutator 3 and a coil supporting body 4 of transformer iron, which is made of an annular portion with a center bar 5.

Each segment upon the commutator is electrically connected with a segment diametrically opposed to it. For instance segments 15 and 16 are connected as are segments 13 and 14 and all the other segments are similarly connected.

Upon opposite sides of the body 4 and surrounding the body 4 is a coil composed of parts 6 and 7. This coil is wound in a continuous direction around the body 4, and at mid points 8 and 9 is joined with conductors 10 and 11. The conductor 10, as will be seen, is electrically connected with a conductor 12, which is connected with segments 13 and 14 upon commutator 3 and with ring 1. The conductor 11, as shown, is joined with a segment 15, which segment is in electrical connection with a segment 16, this conductor being connected to ring 2.

Tap offs from intermediate points upon the coil parts 6 and 7 are connected with the commutator bars. The point 17 upon coil part 6 is joined with the segment $17^a$. The point 18 upon coil part 6 is joined with segment $18^a$, and so on throughout the extent of the coil part 6, until we reach the point 9 which, as heretofore stated, is connected with the segment 15.

The number of turns of wire composing the coil part 6, which lie between the points 8, 17, 18 and so on are not absolutely fixed, but are chosen with a view to giving the best results in the operation of the machine. Preferably the number of turns which are included between the tapping points is different because, as will be later explained, the potential difference with respect to the instantaneous voltage between successive coils varies from the points 8 and 9 toward the central or neutral points of the coils which are represented at 19 and 20.

The coil with its two parts 6 and 7, wound upon the core 4 and provided with the tap-off conductors from which current may be taken, forms an autotransformer, and, as is well known, this type of electrical device has a high efficiency.

The alternating current is fed in over conductors 21, 22, which are electrically connected with brushes that bear on the rings 1, 2. It will be apparent from the connections which have heretofore been explained that the alternating current passing from the rings will pass over conductors 12 and to segment 15; thence over the conductors 10 and 11 to the points 8 and 9 of the coil parts 6 and 7.

Upon the commutator are brushes 23 and 24, these brushes being spaced apart, such a distance that when the brush 23 is on the segment 15 the brush 24 will bear upon the segment 14.

I would refer to the diagrammatic illustration at the extreme right of Fig. 2, and I will discuss this illustration merely because the brushes, as they are shown, are placed at a point with respect to the commutator from which point it is convenient to begin a consideration of what is taking place as relative rotation occurs between the commutator and brushes.

In the portion of Fig. 2 just mentioned it will be seen that the brushes $23^a$ and $24^a$ are contacting with those segments which are connected with the points $8^a$ and $9^a$ of the coils respectively. There is therefore between the brushes $23^a$ and $24^a$ the maximum voltage, because the brushes are at this time in effect connected directly across the alternating current line.

As the brush 24 moves relatively so as to contact with the segment $17^b$ and the brush 23 moves so as to contact with the segment 25, the brushes are connected with the points $17^c$ and 26 upon the coils of the auto-transformer, and the voltage between these points is something less than the maximum voltage, and the voltage change or difference in voltage between points $8^a$ and 26, and $9^a$ and $17^c$ is the same.

Considering the relative movement between the brushes and commutator to continue, the brushes $23^a$ and $24^a$ will eventually contact with segments 27 and $19^b$ which are electrically connected with the points $19^a$ and $20^a$ respectively upon the auto-transformer. At these points last mentioned, the voltage between brushes is equalized, for it will be clear that these points are upon the auto-transformer midway between the points $8^a$ and $9^a$. Therefore there would be no current flowing between the brushes at this time.

If, for the moment, we should consider that there was no change in the direction of flow of the current supply over the conductors $21^a$ and $22^a$, and further consider that the relative rotation between the brushes and commutator continues, it is clear that the direction of flow of current between the brushes $23^a$ and $24^a$ would be reversed in direction from that which it had been before the brushes passed the segments connected with the points $19^a$ and $20^a$ upon the transformer.

However, in the arrangement of elements as here employed, the points of equalized voltage between the brushes, namely, at the points $19^a$ and $20^a$, are also made to be points of zero voltage of the impressed alternating current wave.

This is brought about by causing the relative rotation between the brushes $23^a$ and $24^a$ and the commutator to be in synchronism with the reversals of the alternating current which is supplied to the device.

The shaft upon which the commutator is mounted is caused to rotate by a synchronous motor which causes such a rotation of the shaft that the commutator and brushes are relatively so positioned that the brushes are contacting with the segments connected with the points $19^a$ and $20^a$ of the autotransformer when the A. C.-E. M. F. wave is at zero.

It will thus be understood that as the brushes leave those segments which are connected with the points $19^a$ and $20^a$ of the auto-transformer, the direction of flow of the supplied alternating current is reversed. Consequently the flow of current between the brushes $23^a$ and $24^a$ is not reversed, as would be the case if the alternating current itself had not reversed. The relative rotation between the brushes and the commutator will, as they continue, be but a succession of the same character of changes as that which has just been mentioned, and it will be seen that there are four such reversals of current as here described in a complete relative revolution of the commutator with respect to the brushes. It will thus be seen that the current flowing between the brushes 23$^a$ and 24$^a$ is at all times a pulsating direct current.

From the foregoing it will be clear that the points 19$^a$ and 20$^a$ are points of zero voltage and the points 8$^a$ and 9$^a$ are points of maximum voltage with respect to the impressed A. C. voltage wave. And the taps from the transformer coil between these points will represent points of different instantaneous voltages between the maximum voltage and zero.

The collector brushes 23$^a$ and 24$^a$ therefore, as they travel, will connect points of equal voltage difference or change with respect to the transformer coil ends adjacent the particular taps under consideration, or, in other words, the brushes will follow the A. C. voltage wave from crest to lowest part, and then to crest, and so on, except that the portions of the voltage wave which would ordinarily go below the zero line are reversed and placed above the zero line, as previously explained, thereby producing a pulsating direct current.

Having thus generally explained the device, it would be well to again refer to the auto-transformer and the manner in which it is wound.

As before described, the coil is wound upon the arms of the iron body 4 which is preferably made of laminated sheets of metal as ordinarily employed, the total number of turns for the coil being determined by the particular conditions demanded by the service to which the machine is to be placed.

The points for tapping the leads, such as represented at 17, 18, 19, (Fig. 1), which, it will be remembered, are joined to the commutator bars, are selected such that the voltage between adjacent bars will be equal and sufficiently small to avoid sparking which would otherwise be caused by the short circuiting of contiguous bars as the brush passes from one to the other.

For instance, if two or three volts be determined as the proper voltage between bars such that the passing of brush from bar to bar will not produce sparking, the successive points for tapping the auto - transformer will be selected with this end in view.

Inasmuch as the points 8 and 9 upon the transformer coil are points of highest potential, that is, the brushes are electrically connected with these points when the wave of the impressed A. C.-E. M. F. is at the crest, a voltage difference of two or three volts may occur between two or three turns of the coil upon either side of points 8 and 9. The number of turns between which this voltage difference exists would increase away from the points 8 and 9 and toward the neutral points 19 and 20, at which the A. C.-E. M. F. wave is neutral. I have only indicated this variation of turns between taps in the drawings, and it will be readily understood that the selection of the number of turns between adjacent taps is a matter which must be determined according to the characteristics and service to which a particular machine is to be put. This matter of the number of turns is also dependent in part upon the deformation of the D. C.-E. M. F. wave, which is desired, as will be later explained.

From the foregoing description, it will be clear that as the commutator and brushes move relatively, the effect is in reality a commuting of the current which is taken from the coil of the auto-transformer,—the result being comparable with the result which is obtained by commuting current generated by a single coil, rotating and cutting the magnetic lines of a magnetic field of force.

An additional feature inherent in this device and to which especial attention is directed is that the circuits are never entirely opened. Therefore, under normal conditions, there is no chance for an arc to establish itself, and, if the connections between the commutator segments and the transformer coils are properly arranged so that the voltage between consecutive bars is low, there will be no sparking.

This feature of never having the circuits entirely open is of considerable value and importance, particularly in handling currents for power installations. Normally an arc will not be established unless a circuit is completely opened; however if a circuit be opened and quickly closed, should an arc be started, it is almost instantly beyond control, due to the negative co-efficient of conductivity of air, and the heating power of the arc is so great that considerable damage may be done in a short interval of time.

As has before been stated, the device, such as shown in Fig. 1, will produce a pulsating direct current which is commercially usable for certain purposes. However, if it be desired to obtain a more nearly uniform direct current, the same can be accomplished by using three of the devices such as shown in Fig. 1, each of which is connected with adjacent legs of a three phase circuit.

In this event, the brushes and the commutators of the three devices are relatively so arranged that each pair of brushes and its commutator segments are placed 120 electrical degrees from adjacent brushes and segments; and further the brushes upon the commutators are electrically connected in series.

Such an arrangement of devices for three phase rectification is shown in Fig. 2 of the drawings, each device being the same as that shown in Fig. 1, except for the relationship which exists between brushes and commutator bars upon three machines at a given time. In Fig. 2 referred to, each machine is shown as supplied with an alternating current through a three phase transformer which is generally represented at 28, each machine being supplied with current from a separate part of the transformer. This is merely incidental and, as before stated, it is entirely possible to connect the machine with adjacent legs of a three phase alternating system, where the voltage on the line is proper for the design of the machine. Otherwise a transformer should be used as indicated.

As will be clear from an inspection of Fig. 2 the sets of brushes 29 and 30 on the two machines which are at the left hand portion of that figure are in a different position with respect to the segments 17$^f$ and 17$^e$ respectively than the brushes 23$^a$ and 24$^a$ with respect to the segment 17$^b$. The various segments which have just been mentioned on the commutator are connected respectively with the same portions of the transformer coil in each instance. These sets of brushes 29, 30, and 23$^a$ and 24$^a$ are arranged to be 120 electrical degrees from each other when considered with respect to the same segment on each of the commutators.

As will be noted, the conductors 31, 32 and 33 which lead from the brushes bearing on the commutators of the respective devices are all connected in series so that the current which passes out on the line 34, which is the D. C. line, will carry a current which is the additive result of the D. C. currents developed in the respective machines.

This resultant current would, under ordinary circumstances, be pulsating in character inasmuch as it is an alternating current with those portions of the voltage wave which normally occur below the zero line all turned above the zero line, and the resultant voltage curve of such a current would show a pulsating voltage line which will fluctuate about 10 or 15 per cent., but which never reaches the zero line.

However, the windings on the autotransformer may be so arranged as to provide a rectified D. C. current E. M. F. which will have a voltage curve that will be practically a straight line.

As heretofore mentioned, a single device embodying any of the forms described will produce a pulsating rectified current where voltage wave fluctuates between zero and a maximum. Any three of the machines connected as described will rectify a three phase current producing a direct current, which is less pulsating than that produced by a single machine. The voltage fluctuation being about 10 to 15 per cent. of the maximum voltage, but never falling to zero.

It will be understood that the voltage wave representing the rectified current produced by a single device herein described will be a sine wave with the parts below the line turned above the zero line, and in the case of a polyphase current the voltage wave will be the resultant of the plurality of sine waves.

The voltage curve representing the voltage of a rectified three phase current would show a curve such as indicated in Fig. 10 from which it will be seen that the current is pulsating.

I have found that it is possible to produce from a rectified three phase current a direct current, the voltage of which is substantially uniform. This is a feature of the fact that the number of turns between the tap-offs on the autotransformer is varied. It will be recalled (referring to Figs. 1 and 2) that the relative rotation between the commutator segments and the brushes is in synchronism with the reversals of the alternating current being rectified, and further that the device is so constructed that the brushes contact segments connected with the points 19 and 20 when the E. M. F. wave is zero, and the brushes contact segments connected with points 8 and 9 when the E. M. F. wave is maximum. The number of turns of wire between consecutive tap-offs decreases as the brushes pass from the segments 19 and 20 to the segments 9 and 8 respectively, and the number of turns between consecutive tap-offs increases as the brushes pass from segments 8 and 9 toward the segments 19 and 20 respectively.

This arrangement of windings on the autotransformer produces a deformed rectified E. M. F. wave, the wave being more peaked and having the lower parts of the wave drawn in toward each other.

Manipulation of the number of turns between tap-offs on the autotransformer will permit the production of a wave more or less deformed from the sine wave shape and by suitable manipulation the resultant E. M. F. wave of a rectified three phase current may be made substantially uniform as indicated in Fig. 11.

In this figure the superimposed E. M. F. sine waves of a rectified three phase current is shown in dotted lines, while the superimposed deformed E. M. F. waves produced as above explained are shown in full lines. It will be seen by adding the voltages in the lines A and B that the resultant voltages are substantially the same and would be as renresented by a substantially continuous line, such as that upon which the letters A, B, are placed.

In Fig. 3 there is shown a type of device which, so far as principle is concerned, is the same as that shown in Fig. 1. It differs in that the transformer does not rotate, and further that this transformer utilizes in addition to a primary coil a secondary coil, from which leads are tapped throughout its length, which leads are led to a stationary commutator with brushes bearing upon the commutator and rotating with respect to the same.

The transformer of Fig. 3 may generally be represented at 35 and comprises a central core 36 of transformer iron upon which is a winding 37. This winding may be connected directly with a single phase A. C. line, from which the source of current to be rectified is obtained. The transformer 35 has four sides, also made of transformer iron which are arranged in substantially rectangular form, and upon two of the sides which extend parallel with the central core 36 is wound a coil of two parts 38 and 39. These coil parts 38 and 39 just mentioned form a secondary with respect to the coil 37, and the windings of the coil 37, and the coil parts 38 and 39 will be proportioned so that there will be induced in the coil parts 38 and 39 a current of proper voltage for the design of the machine and for the rectified D. C. current which it is desired to obtain.

The coil parts 38 and 39 are tapped at certain portions throughout their length in a manner similar to that indicated with respect to the coil parts 19 and 20 in Fig. 1, and the same general considerations respecting the number of turns between the tapping points should be observed with respect to the device shown in Fig. 3 as that shown in Fig. 1, which considerations have heretofore been explained and will not again be discussed. These taps from the part 38 of the coil are represented at 40, 41, 42, 43, 44 and 45, and the taps upon the coil part 39 are represented at 40ª, 41ª, 42ª, 43ª, 44ª and 45ª. As the brushes rotate they will connect points 45 and 40ª, then point 44 and 41ª, then points 43 and 42ª, etc., the sequence following the same as explained with respect to Fig. 1.

A stationary commutator is represented at 46,—this being mounted in any suitable manner. The various conductors which are connected with the taps on the coil parts 38 and 39 are led to the segments 40ᵇ, 41ᵇ, and to the segment 40ᶜ, 41ᶜ, etc., respectively, and, as indicated in Fig. 1 and in Fig. 3 the segments on the commutator which are diametrically opposed to each other are connected to each other.

Upon a rotating shaft 47 there are mounted brushes 48 and 49,—these brushes bearing upon the interior surface of the commutator. A stationary commutator with brushes rotating upon the interior thereof is a construction which is well known in the electrical art, and any suitable form may be used. The brushes 48 and 49 are electrically connected with collector rings 50 and 51, upon which bear brushes 52 and 53, which brushes collect the current from the rings,—the last mentioned brushes, being connected with conductors 54, which form the D. C. circuit.

In this particular type of device shown, and just described, it is possible to use the same with currents of high value, both with respect to their amperage and voltage, and it will be appreciated that the transformer may be suitably cooled either by a fan or immersion in an oil bath, which may be cooled in any desired manner,—all of which expedients are well known in the art and do not need description here.

In Fig. 5 I have shown a slightly different form of device than that shown in Fig. 3, although the principle involved is the same. In this figure there is shown a transformer core represented at 55, which is of substantially rectangular form. Upon one leg of this core there is wound a coil 56 which is suitably connected with the source of alternating current from which the current to be rectified is obtained.

Upon the opposite leg of the core is a coil 57 which forms a secondary with respect to the coil 56, and, as will be appreciated, the coils 56 and 57 will be arranged respecting the number of turns which they each may have, in accordance with the transformation of voltage which it is desired to obtain from the supply A. C. line.

The coil 57 performs the function of a variable voltage transformer with respect to the remaining part of the device, and is the equivalent of the coils 38 and 39. From this coil there will be led taps 58, 59, 60 and 61, and taps 59ª, 60ª, and 61ª. The positioning and spacing of these taps and the number of turns of wire which are included between them will be determined in accordance with the considerations heretofore set forth with respect to the coils shown in Fig. 1, and need not here be further set forth.

The particular lead, for instance 58, will be connected with the sements 58ᵇ and 58ᶜ, and the other leads or taps will be connected with the other segments of the commutator 62, as shown in Fig. 5,—it being remembered that in this construction, as in previous constructions explained, the segments which are diametrically opposed to each other will be directly electrically connected.

The commutator 62 is stationary and brushes 63 and 64 are caused to rotate upon the interior surface of this commutator, being mounted upon a rotatable shaft 6, and, as before stated, similar constructions being well known in the art, no description will be given. These brushes are electrically connected with collector rings 65ª and 65, which have suitable brushes bearing upon them,— the last mentioned brushes being connected with the conductors 66 forming the external rectified D. C. circuit.

As will be apparent, the devices which are shown in Figs. 3 and 5 will develop a rectified D. C. current which is pulsating in its characteristics, the same as the rectified current developed by the device shown in Fig. 1.

It will be apparent that devices of the construction shown in Fig. 3, or devices shown in the construction shown in Fig. 5 may be utilized, and so connected with each other as to rectify a three-phase current in the same manner as has been shown and described with respect to the construction of Fig. 2. And in Fig. 4 I have shown three devices which correspond with the construction shown in Fig. 3, these three devices being suitably connected together to rectify a three-phase current.

In this figure the three conductors carrying the three phase current are represented at 67, 68 and 69. The primary coils 70, 71 and 72 will be connected between adjacent legs of the three phase circuit. As shown in the drawing, the coil 70 is connected between the legs 67 and 68; the coils 71 between the legs 68 and 69, and the coil 72 between the legs 69 and 67.

There is no need of a separate three phase transformer, as shown in Fig. 2, for the reason that the primary coils 70, 71 and 72 form a transformer which will transform the current from the voltage and amperage at which it is received to a current of suitable voltage and amperage to be handled by each of the devices making up the three phase transformer, as shown in Fig. 4. While I have shown three separate transformers for the device, it will be clear that these may be combined in one transformer as is usual in three phase transformers.

The relationship existing at any given time between the brushes of the three devices forming the rectifier for the three phase current will be seen by reference to Fig. 4. As shown in this figure, the segments 40ᶜ, 40ᵈ and 40ᵉ represent segments upon the three commutators respectively, all of which are connected with correspondingly the same points or taps upon the secondary transformer coils of the respective devices, and, as shown in this drawing, the brushes are all arranged differently with respect to these particular segments. These brushes are substantially 120 electrical degrees apart from each other when considered with respect to corresponding segments upon the several commutators.

As will be seen, the circuits carrying the rectified D. C. current from each of the separate devices are connected in series. Therefore the current which passes through the external circuit represented by the conductors 67 will be a composite of the three rectified currents which are developed in each of the machines separately.

In this respect the device just described is comparable to the device shown in Fig. 2, and will produce a current having the same current characteristics as explained with respect to that machine, and further, by a suitable winding of the secondary autotransformer coils 70ª, 71ª, 72ª, there may be produced a resultant rectified direct current,—the voltage of which as shown by its characteristic curve will produce a substantially constant voltage, as heretofore explained.

In all of the various devices which have been explained, it will be remembered that I employ a synchronous motor for the rotation of the rotating parts. In Figs. 1 and 2, where the commutator and coil are rotated, these parts will be rotated by such a synchronous motor, while in Figs. 3 to 5, inclusive, where the brushes alone are rotated, these brushes will be rotated by a synchronous motor. In the forms of devices explained, they are designed to be operated by a four poled synchronous motor. For this reason the direct connections between the taps from the coils are connected to only one-half of the segments of the commutator and opposite segments upon the commutator are joined as before explained. In the event that a synchronous motor of other numbers of poles be used, the manner of connection of the taps from the coil would be slightly modified in a manner obvious to those skilled in the art.

I have not herein shown and described any particular synchronous motor construction inasmuch as these devices have attained a distinct status in the art, and are well known, and any synchronous motor may be employed, which motor will run with sufficient precision as to follow the changes in characteristic of the line from which the current to be converted into direct current is obtained.

I have explained the various forms of devices embodying my invention herein with respect to their function for converting an alternating to a direct current. However, it should be understood that it is equally possible to utilize the devices herein disclosed for the purpose of changing the direct current to alternating, and in connection with the showings in Figs. 3 to 5, inclusive, of transforming this converted alternating current in such manner as may be desired.

In the event the device is used to convert direct to alternating current, it will be obvious that the procedure would be in the reverse manner to that which has been described with respect to the changing of alternating to direct current.

In Figs. 6, 7 and 8 I have indicated a form of arrangement of commutator and brushes which is of special value when used in connection with the type of device shown in Fig. 4.

In these figures a rotatable shaft 68 is mounted in end bearings 69 and 70. These bearings are mounted upon a standard 71 which is provided with a face plate 72. Upon the same base to which the standards 71 are secured there will be secured intermediate supporting means indicated at 72 and 73,—these supporting means comprising oppositely facing plates 74, 75, 76 and 77. Between plates 72 and 74 as well as between plates 75 and 76 and plates 77 and 78 are secured the segments 79 which form the conducting portions of the commutator. These segments may be of any desired form, and will be arranged as is usual in commutator construction,—that is to say, adjacent segments will be separated from each other by usual forms of insulation.

Upon the shaft 68 are mounted carriers 80, and in these carriers will be mounted the brushes 81. Between the brushes and the carrier 80 will be springs 82,—these springs normally tending to pull the brushes toward the shaft. Therefore as the shaft is rotated and centrifugal force causes the brushes to slide out of their holdings in the holder 80, these springs will tend to counteract the centrifugal forces. In this manner the brushes 81 will be prevented from bearing too hard upon the commutator segments, and the degree of pressure with which they shall bear upon the commutator segments will, of course, be determined by the strength of the springs 82.

It will be understood that the description with respect to the holder 80, the brushes 81 and the spring 82 is true of the other two commutator and brush arrangements which are employed.

The leads from the autotransformer coils, such as shown in Figs. 3 to 5, inclusive, will be connected with proper segments in such a device as shown in Figs. 6 to 8, inclusive, in the same manner as is shown in Figs. 3 to 5, inclusive.

It will be understood that while Fig. 6 discloses three sets of commutators and their brushes for use in connection with a three phase machine, the same arrangements of parts with respect to a single commutator and brushes may be used with devices such as shown in Figs. 3 to 5.

Having described my invention, I claim:

1. In a current converting device, a coil and a body of magnetically permeable material upon which the coil is mounted, said coil being adapted to conduct a single phase alternating current, tap-offs from said coil throughout its length, said tap-offs being so spaced along the coil as to include different numbers of turns of the coil whereby the potential difference between the adjacent tap-offs at the successive points where the current is collected will remain substantially the same, a current collecting means adapted to sequentially be connected with points of equal voltage change from opposite ends of said coil, and means for moving said current collecting means and taps relatively to each other.

2. In a current converting device, a coil and a body of magnetically permeable material upon which the coil is mounted, said coil being adapted to conduct a single phase alternating current, tap-offs from said auto transformer throughout its length, said tap-offs being so spaced along the coil as to include different numbers of turns of the coil whereby the potential difference between the adjacent tap-offs at the successive points where the current is collected will remain substantially the same, a current collecting means adapted to sequentially connect the tap-offs from the opposite ends of the coil circuit, toward the center of the coil, and from thence to opposite ends of the transformer, and means for moving said current collecting means and taps relatively to continue the operation just expressed.

3. The combination with a single phase alternating current circuit, of a direct current circuit, a coil and a core of magnetically permeable material upon which the coil is mounted, said coil being adapted to be energized by the alternating current from said A. C. circuit, said coil being provided with tap-offs throughout its length, said tap-offs being so spaced along the coil as to include different numbers of turns of the coil whereby the potential difference between the adjacent tap-offs at the successive points where the current is collected will remain substantially the same, a current collecting means adapted to sequentially connect points of equal voltage difference with respect to the ends of said coil, and means for moving the current collecting means and said taps relatively to each other in synchronism with the reversals of the alternating current.

4. The combination with a single phase alternating current circuit and a direct current circuit, of a coil and a core of magnetically permeable material upon which the coil is mounted said coil being adapted to be energized by the alternating current from the A. C. circuit, said coil being provided with tap-offs throughout its length, said tap-offs being so spaced along the coil as to include different numbers of turns of the coil whereby the potential difference between the adjacent tap-offs at the successive points where the current is collected will remain substantially the same, a series of segments insulated from each other, said segments being connected in sequence with the tap-offs, a pair of brushes bearing upon said segments, said brushes being spaced apart a distance such that they bear upon segments which are connected with points of equal voltage difference with respect to the opposite ends of the coil, and means for causing relative rotation between the brushes and said segments.

5. In a current converting device, the combination with a transformer comprising a body of mechanically permeable material having a coil thereon adapted to serve as a primary coil, a secondary coil upon the said transformer core adapted to form a secondary and to conduct a single phase current, there being tap-offs throughout the length of said secondary coil, said tap-offs being so spaced along the coil as to include different numbers of turns of the coil whereby the potential difference between the adjacent tap-offs at the successive points where the current is collected will remain substantially the same, a series of insulated segments connected in sequence with the tap-offs from the said secondary coil, a pair of brushes bearing upon said segments, said brushes being spaced apart a distance such that they bear upon segments connected to points of equal voltage difference with respect to opposite extremities of said secondary coil, and means for causing relative movement between the brushes and the segments.

6. In a current converting device, the combination with a transformer having a primary coil adapted to be connected with a single phase alternating current circuit and a secondary coil formed in two parts, tap-offs from both parts of said coil throughout their lengths, said tap-offs being so spaced along the coil as to include different numbers of turns of the coil whereby the potential difference between the adjacent tap-offs at the successive points where the current is collected will remain substantially the same, a series of insulated segments to which said tap-offs are connected in sequence, a pair of brushes bearing upon the said segments, said brushes being spaced apart a distance such that they bear upon segments connected to taps of equal voltage difference with respect to the opposite ends of the parts of said coil, and means for moving the said brushes relatively to the segments.

7. In a current converting device, the combination with a transformer having a coil thereon adapted to be connected to a single phase alternating current circuit and serve as a primary for the transformer, a second coil forming a secondary for said transformer, said coil being provided with tap-offs throughout its length, said tap-offs being so spaced along the coil as to include different numbers of turns of the coil whereby the potential difference between the adjacent tap-offs at the successive points where the current is collected will remain substantially the same, a current collecting means adapted to sequentially be connected with points of equal voltage difference with respect to the opposite ends of said coil, and means for causing relative movement between the collecting means and the tap-offs.

8. In a current converting device, the combination with a transformer provided with a coil adapted to be connected with a single phase alternating current to form the primary of said transformer, a second coil forming a secondary of said transformer, said coil being provided with a series of tap-offs throughout its length and said tap-offs being so spaced along the coil as to include different numbers of turns of the coil whereby the potential difference between the adjacent tap-offs at the successive points where the current is collected will remain substantially the same, a series of insulated segments to which said tap-offs are connected in sequence, a pair of brushes upon said segments, said brushes being spaced apart a distance such that they bear upon segments connected to points of equal voltage difference with respect to the opposite ends of said secondary coil, and means for causing relative rotation between the brushes and the segments.

9. A device for rectifying three phase current comprising three transformer elements having conducting portions adapted to be electrically energized by alternating current flowing in adjacent legs of a three phase circuit, each of the conducting portions of the transformer elements conducting a single phase current and being provided with taps throughout their length and said tap-offs being so spaced along the coil as to include different numbers of turns of the coil whereby the potential difference between the adjacent tap-offs at the successive points where the current is collected will remain substantially the same, a current collecting means associated with the taps for each of said transformer elements, each current collecting means being adapted to sequentially connect points of equal voltage difference with respect to opposite ends of each conducting portion aforesaid, each of the current collecting means being arranged with respect to each other so as to collect current from corresponding taps of each transformer element 120 electrical degrees apart, and means for moving the current collecting means relative to the taps on the transformer.

10. A device for rectifying three phase current comprising three transformer elements being electrically energized from adjacent legs of a three-phase circuit, each of said transformer elements having a conducting portion conducting a single phase current and provided with a series of tap-offs throughout its length, said tap-offs being so spaced along the coil as to include different numbers of turns of the coil whereby the potential difference between the adjacent tap-offs at the successive points where the current is collected will remain substantially the same, three sets of segments, the segments in each set being insulated from each other, and said segments in each set being electrically connected in sequence with the tap-offs from a single transformer element, a pair of brushes bearing upon each set of segments, the brushes in each pair being spaced from each other a distance such that they bear upon segments connected to points of equal potential difference from the opposite ends of the transformer coil associated therewith, brushes and segments for each transformer being displaced 120 electrical degrees with respect to each other, and means for causing relative rotation between the brushes and the segments.

11. In a device for rectifying three phase current, the combination with three auto transformers connected between adjacent legs of a three phase circuit, each of said transformers serving to conduct a single phase current, tap-offs from each of said transformers throughout the length thereof, said tap-offs being so spaced along the coil as to include different numbers of turns of the coil whereby the potential difference between the adjacent tap-offs at the successive points where the current is collected will remain substantially the same, three non-rotatable commutators, the tap-offs from each transformer being connected in sequence with the segments of one of the commutators, a pair of brushes adapted to bear upon the interior of each of said commutators, a shaft upon which said brushes are mounted, the brushes and segments for each set being arranged 120 electrical degrees from each other, and means for rotating the brushes.

In testimony whereof I hereunto affix my signature in the presence of two witnesses.

ARTHUR R. BULLOCK.

Witnesses:
A. J. HUDSON,
L. I. PORTER.